United States Patent [19]

Lomasney et al.

[11] Patent Number: 5,262,024
[45] Date of Patent: Nov. 16, 1993

[54] METHOD FOR EFFECTING THE DESORPTION OF IONIC SPECIES FROM A SOIL MATRIX USING WAVE ENERGY

[75] Inventors: Henry L. Lomasney; Richard A. Graves, both of New Orleans, La.

[73] Assignee: Ionex, New Orleans, La.

[21] Appl. No.: 683,973

[22] Filed: Apr. 8, 1991

Related U.S. Application Data

[63] Continuation-in-part of Ser. No. 550,831, Jul. 11, 1990, abandoned, which is a continuation-in-part of Ser. No. 383,045, Jul. 21, 1989, abandoned, which is a continuation-in-part of Ser. No. 348,525, May 8, 1989, Pat. No. 5,091,447.

[51] Int. Cl.$^5$ .............................................. B01J 19/12
[52] U.S. Cl. ............................ 204/157.43; 204/158.2; 204/182.2
[58] Field of Search ................ 204/157.43, 149, 157.4, 204/157.41, 157.42, 157.44, 158.21, 158.20, 182.2; 47/1.3

[56] References Cited

U.S. PATENT DOCUMENTS

| | | | |
|---|---|---|---|
| 4,747,920 | 5/1988 | Muralidhara et al. | 204/157.42 |
| 4,882,021 | 11/1989 | Barnhart | 204/158.21 |
| 4,978,508 | 12/1990 | Hansen et al. | 204/158.21 |
| 5,098,538 | 3/1992 | Kim et al. | 204/158.2 |

OTHER PUBLICATIONS

Hideo Okabe, Photochemistry of Small Molecules, 1978, John Wiley & Sons, Inc, p. 58.
Douglas Skoog & Donald West, Principles of Instrumental Analysis, 1971 by Holt, Rinehart & Winston, Inc, pp. 5, 13.

*Primary Examiner*—W. Gary Jones
*Assistant Examiner*—Dean Tan Nguyen
*Attorney, Agent, or Firm*—Foley & Lardner

[57] ABSTRACT

Applying a desorbing wave energy to a soil matrix can effect desorption of ionic species which are associated with the matrix. This method is especially applicable to decontamination of soils to which metals and/or radioactive isotopes are adsorbed. The desorbing energy may be microwave energy, sonic or ultrasonic energy, etc., or combinations thereof. An electromagnetic potential also can be applied to the matrix to enhance desorption and or migration of the species. An electrolyte also may be added to the matrix to enhance desorption and or migration of the species.

29 Claims, No Drawings

METHOD FOR EFFECTING THE DESORPTION OF IONIC SPECIES FROM A SOIL MATRIX USING WAVE ENERGY

CROSS REFERENCE TO RELATED APPLICATION

This application is a continuation-in-part of U.S. application Ser. No. 07/550,831, filed Jul. 11, 1990 now abandoned, which is a continuation-in-part of U.S. application Ser. No. 07/383,045, filed Jul. 21, 1989now abandoned, which is a continuation-in-part of U.S. application Ser. No. 07/348,525 filed May 8, 1989 now issued U.S. Pat. No. 5,091,447, the disclosures of which are expressly incorporated herein by reference.

FIELD OF THE INVENTION

This invention relates to the use of wave energy (e.g., microwaves, radio waves, sonic and ultrasonic waves, etc.) to effect or enhance the dissociation of ionic species from a soil matrix.

BACKGROUND OF THE INVENTION

The industrial revolution and, most recently, new technology involving nuclear fission have introduced new toxicological problems into the environment. Heavy metals and radioactive isotopes of elements are today being handled in unprecedented quantities and concentrations. The metal toxicity and radioactivity associated with long-lived high-radiation isotopes are particularly of great concern. Indeed, the disposal problems presented by radioactive isotopes originating directly or indirectly from the operation of nuclear facilities have produced a strong resistance to this technology.

Similarly, years of metals contamination from improperly designed facilities, accidental spills and intentional dumping have resulted in substantial inventories of undesirable metallic species in soil, often covering large areas. This can lead to accumulation of trace elements, especially toxic heavy metals, in the food chain, thereby resulting in unacceptably high concentrations of contaminants in animals and plants. Other types of accidents, such as the nuclear reactor accident at Chernobyl, can cause radioactive fallout which contaminates hundreds of square miles of surrounding land, albeit only to a depth of a few inches of the topsoil.

The ability of such trace metallic elements to spread and further contaminate surrounding areas is governed by basic physicochemical phenomena. For example, soil pH can play an important role in the mobility of some metallic elements, particularly the group comprising cobalt, copper, mercury, nickel, silver, and uranium. The mobility of those elements is related to their solubility in water. The group comprising molybdenum, selenium, uranium, and vanadium mobilizes readily under oxidizing conditions since in all cases the higher oxidation states of these elements are much more mobile.

Previously, electrokinetic soil processing using currents on the order of milliamps per $cm^2$ of electrode area has been demonstrated for removal/separation of organic and inorganic contaminants and radionuclides. Electrokinetics, which relates to the motion of particles or liquids resulting from a difference of electric potential, as used herein can include electrophoresis, electro-osmosis and electrolytic conduction. Electrophoresis is the movement of suspended particles, e.g., colloidal particles, charged particles, clay particles and such, through a fluid such as a pore liquid under the action of an electromotive force. Electro-osmosis is the movement of a pore fluid due to the influence of an electric field, and electrolytic conduction relates to the movement of simple ions due to the influence of an electric field.

There is limited literature concerning removal of ions from soils by the electrokinetic phenomena. One of the earliest studies is by Jacobs and Mortland (1959), who demonstrated that alkali metals can be extracted from clays by electrokinetics. In 1980, Segal reported that heavy metal concentration substantially increased in an effluent after subjecting same to an electropotential. Hamnet (1980) showed that salts in agricultural soils could be moved by electrokinetics. Shmakin (1985) noted that electrokinetics have been used in the Soviet Union since the early 1970's as a method for concentrating metals and exploring for minerals in deep soil deposits. In 1986, Runnels and Larson demonstrated that $CuSO_4$ could be extracted with an electropotential gradient. U.S. Pat. No. 4,935,114 to Varma discloses the use of microwave-enhanced chemical processes for disposal of toxic waste including chlorinated hydrocarbons, in which non-metallic particulates having a high dielectric loss factor and toxic wastes are subjected to a temperature in excess of 400° C. in the presence of microwave radiation. U.S. Pat. No. 4,645,004 to Bridges et al. discloses an electro-osmotic method for producing hydrocarbons utilizing in-situ heating of earth formations having substantial electrical conductivity.

Notwithstanding the aforementioned limited successes, the efficiency of electrokinetic extraction procedures has been found to be compromised by ion insolubility or by ion immobilization, most notably when soil clays are involved. In such instances, contaminant ions (generally metal) which are associated with the clay, generally by adsorption in one or more of a multitude of complex states, will be extremely difficult to remove by electrokinetic means.

In certain instances, metals can be mobilized by electropotential only after altering the chemical complexation and/or valence state of the ion by means of chemicals which are applied to the soil. There are, however, serious limitations to altering the behavior of the soil clay/metal ion kinetics via introduction of chemicals. Such limitations can include, inter alia, the massive quantity of chemicals required and the affect of the chemicals on the environment. In most cases, such chemicals participate in competing reactions, which are often unnecessary and even undesirable. Thus, the ultimate effect of treating soil with such chemicals may be directly contrary to the overall objective of environmental remediation.

In other instances, soil can be physically removed from the ground and subjected to "soil washing" in which chemicals are used to try to remove contaminants or other species from the soil.

At other times, it may be desired to remove one or more associated species because of the intrinsic value of the species. For example, it may be desired to obtain certain minerals which are present in soil, and which are adsorbed, entrapped or otherwise associated with the soil.

At still other times, it may be desirable to enhance an already existing chemical, mechanical or electrical process for dissociating species within a matrix.

Accordingly, there is a continuing need for methods for effecting or enhancing the dissociation of species such as contaminants or desirable metals which are associated with a matrix such as soil. This is especially true where, as discussed above, the contaminant is a radioactive isotope and the soil is a soil clay.

Similarly, there is a also a continuing need for methods for effecting or enhancing the dissociation and/or migration of a species associated with a matrix. Such methods would be particularly useful, for example, for decontaminating soil, concentrating and/or confining contaminants within soil, and removing or concentrating desirable minerals within soil.

There is also a continuing need for effecting or enhancing such dissociation and/or migration for species which are confined generally near the surface of the matrix, for example, the topsoil surrounding Chernobyl, as well as those which are found generally at all depths or just at deeper depths.

SUMMARY OF THE INVENTION

It is thus an object of this invention to provide a method for effecting or enhancing the dissociation of an ionic species which is associated with a matrix such as soil.

It is a further object to provide a method for effecting or enhancing the dissociation of metals and radioactive isotopes from soil clays.

It is also an object of this invention to provide a method for effecting or enhancing the dissociation and/or migration of an ionic species associated with a matrix.

It is a further object of this invention to provide a method for decontaminating soil in which metals or radioactive isotopes are associated with soil particles, e.g., by adsorption, physical entrapment or other means of immobilization.

It is a further object of this invention to provide methods for carrying out such dissociation and/or migration for ionic species which are confined relatively near one surface of the matrix such as the top, as well as ionic species which are present throughout or at deeper depths of the matrix.

Accordingly, one embodiment of this invention provides a method for effecting or enhancing the dissociation of at least a portion of an ionic species associated with a matrix such as soil, comprising applying to the matrix dissociating wave energy in an amount sufficient to effect or enhance dissociation of at least a portion of the species from the matrix. Preferred embodiments include the use of electromagnetic waves such as microwaves and/or sonic or ultrasonic waves as the dissociating wave energy. Other preferred embodiments provide the use of electrolytes to enhance or effect the dissociation and/or migration of the species. Yet another preferred embodiment provides the use of an electromagnetic potential to enhance the dissociation and/or migration of the contaminants.

Other embodiments involve applying the dissociating wave energy to the matrix by a wave generator external to the matrix, or at least partially within the matrix.

Another embodiment of this invention provides a method for effecting or enhancing the dissociation and/or migration of at least a portion of an ionic species associated with a matrix such as soil, in which species are associated with the matrix, e.g., by adsorption, entrapment or other immobilization in or onto soil particles. The method comprises the steps of applying to the matrix dissociating wave energy in an amount sufficient to effect or enhance dissociation of at least a portion of the species; and applying to the soil an electromagnetic potential sufficient to enhance dissociation and/or effect migration of at least a portion of the dissociated contaminants.

As above, preferred embodiments include the use of electromagnetic waves such as microwaves and/or sonic or ultrasonic waves as the dissociating wave energy. Other preferred embodiments provide the use of electrolytes to enhance the dissociation and/or migration of the species. Yet other embodiments provide the application of the dissociating wave energy to the matrix by a wave generator external to the matrix, or at least partially within the matrix.

Additional objects and advantages of the invention will be set forth in part in the description that follows, and in part will be obvious from the description, or may be learned by practice of the invention. The objects and the advantages of this invention may be realized and obtained by means of the compositions and methods particularly pointed out in the appended claims.

DESCRIPTION OF THE PREFERRED EMBODIMENTS

It has been discovered that dissociating wave energy can be applied to a bulk matrix which contains associated ionic species to effect or enhance dissociation of at least a portion of the associated ionic species within the matrix. Further, it has been discovered that the simultaneous application of an electromagnetic wave and DC potential to the matrix can effect or enhance dissociation and the subsequent migration in a desired direction of at least a portion of the dissociated species. Still further, it has been discovered that the foregoing process can be enhanced by the addition of an electrolyte to the matrix. Advantageously, the migration of dissociated species by means of a electromagnetic potential can be part of an overall electrokinetic extraction process in which the species are directed toward a collector or are at least concentrated in an area to enhance removal.

The electrokinetic extraction process can encompass electro-osmosis, electrophoresis, or electrolysis to varying degrees, depending upon the soil saturation, soil composition and similar parameters. In general, electrolytic conduction can offer a more rapid ion transport where dissociation (e.g., desorption) conditions are favorable. Electro-osmosis is a somewhat slower transport phenomenon that plays an important role when an electrolyte is introduced into the electromagnetic potential.

The matrix may be any medium in which ionic species are capable of association. Of particular interest are soil matrices which can also comprise clay, sand, and/or humus. Other components may also be present in the soil.

Conversely, the ionic species which are contemplated in this invention include those which can associate with a matrix. For example, ionic species can include metals (including heavy metals), radioactive isotopes, etc. The species can be an unwanted contaminant or a desired compound. It has been found that the aforementioned methods for effecting or enhancing dissociation and/or migration of species within a matrix are especially applicable to soil clays, where ionic species can be tightly adsorbed or otherwise immobilized onto clay particles. This is especially true where the species are contaminants such as radioactive isotopes or metals such as heavy metals. In such instances, the species can be adsorbed or otherwise immobilized on the clay in one or more of a multitude of complex states which are difficult to remove solely by electrokinetic means.

By "association," it is meant that the species is somehow retained or relatively immobilized within the matrix. Association includes any chemical or physical means such as absorption, adsorption, ionic or covalent bonding, physical entrapment, etc., which causes the species to be relatively immobilized within the matrix. For example, the species may be a metal ion or radioactive isotope that is adsorbed onto clay. Alternatively, the species may be an insoluble complex which is physically entrapped within the soil. Other types of association may be possible.

The dissociation of the species is brought about by applying dissociating wave energy to the matrix in amounts sufficient to effect or enhance dissociation of at least a portion of the associated species. The amount of wave energy will be readily apparent or may be learned by routine experimentation. By enhancing, it is meant that the method of this invention may be used in combination with other processes, either natural or man-made, which effect some dissociation of the associated species.

The term dissociating wave energy means energy which is applied for the primary purpose of effecting dissociation of associated ionic species. The dissociating wave energy, which can comprise electromagnetic waves, is different from the electromagnetic potential (e.g., DC potential) which is applied for the primary purpose of effecting or enhancing migration of already dissociated ionic species (although the use of the electromagnetic potential, in combination with dissociating wave energy, to enhance dissociation is explicitly encompassed by this invention). The dissociating wave energy can differ from the electromagnetic potential either in the type of wave, or in the way in which it is applied, or both.

Examples of such wave energy include, inter alia, electromagnetic waves such as microwaves and radio waves, and sonic or ultrasonic waves. Combinations of the same or different types of wave energies also may be employed. For example, combinations of microwave energies, e.g., of different frequencies, may be employed. Alternatively, combinations of microwaves and ultrasonic waves, etc., may be employed. Other types of dissociating wave energies and combinations thereof may be readily apparent to those skilled in such art, or may be learned by routine experimentation. It has been found that microwaves can serve as an acceptable dissociating wave energy. Other acceptable types of wave energy may include, for example, any electromagnetic or non-electromagnetic fields which generate a high frequency oscillation sufficient to shift the equilibrium of the species (e.g., metal ions or heavy metal ions) sorbed onto or otherwise associated with the matrix (e.g., soil clay). Advantageously, the equilibrium is shifted toward a more soluble or mobile species.

The dissociating wave energy can be applied in different ways depending upon the situation. The dissociating wave energy can be applied to the matrix by a wave source external to the matrix, or by a wave source at least partially or completely within the matrix. Alternatively, combinations of such sources can be used. The external source may be desired when, for example, the contaminants are present (either permanently or temporarily) in an area relatively near one side or the outside of the matrix such that application to the one side or outside will effect dissociation of a desired amount of species. This might be the case, for example, when decontaminating an area that has received radioactive fallout and the contamination is confined relatively near the surface. Alternatively, the dissociating wave energy could be applied from a source that is placed partially or completely within the matrix. This might be desirable where the species is located deeper within the matrix. An acceptable configuration can be determined by routine experimentation. Further, it may be desirable to orient the field so as to compliment the transport of the ionic species in the desired direction. As but one example, positioning electrodes (which are the source of the microwave dissociating wave energy) at a 90° orientation with respect to the DC potential may be advantageous. Other orientations which may be advantageous can be determined by routine experimentation. The DC potential may be applied before, during or after application of the dissociating wave energy. It is contemplated that they can be applied concurrently for at least some period of time.

As mentioned above, the use of wave energy to dissociate an associated species is advantageously part of an overall process in which a dissociated species is driven by means of an electromagnetic potential to a collector, or is localized or otherwise concentrated to permit a more efficient removal thereof. The electromagnetic potential is advantageously a DC potential. The forced migration of species by use of electromagnetic potential, as well as the use of collectors for such species, is discussed in the above-referenced co-pending application Ser. No. 07/550,831, filed Jul. 11, 1990, the disclosure of which is incorporated herein by reference.

It has also been discovered that applying an electrolyte to the matrix may enhance the process of dissociation and/or migration of the associated species. The electrolyte can be, for example, an ion complexant, sequestering, or chelation agent, or combination thereof, or other composition which enhances the solubility and/or mobility of a species (e.g., metal ion) which has been energized to an elevated energy state by the dissociating wave energy. Examples of electrolytes include water, aqueous solutions of sodium DTPA (Sodium Diethylene Triamine Penta Acetate), SYNEX 272 (an Amine type organic complexant), Claixarene, and polyethyleneimine. Other electrolytes will be apparent to those of ordinary skill in such art, and can be determined by routine experimentation as described below.

The quantity of electrolyte used will be determined experimentally, and generally will be proportionate to the quantity of species present and the desired degree of removal. The electrolyte can be initially applied to the matrix batchwise or may be applied to the matrix continuously or intermittently over a period of time.

While not wishing to be bound by any particular theory, it is believed that the enhanced extraction of ionic species which is observed when the oscillating wave energy field is present can be attributed to two distinct phenomena.

First, the enhanced sorption/desorption of ionic species from soil clays results from dual effects, namely, a kinetic effect and a free energy shift. The kinetic effect occurs due to a breakdown of the "Helmholtz layer" surrounding the clay particle. This would give rise directly to enhanced desorption. Alternatively, breakdown of the "Stern layer" enhances desorption inasmuch as this layer acts as a "repulsive layer" tending to resist the electrolytes' potential for complexing with the target ionic species.

The energy state is described by the Gibbs equation G= H−T S. The shift in the ratio of "bound" ions versus "free" ions which is caused by the oscillating field-perturbation can be explained by the principle of the Le Chatlier. Namely, the oscillation of ions in the clay matrix produces a rise in the free energy of the ion's absorbed state; at the same time, the increased energy increases the entropy term, thus the shift in equilibrium. This shift is superimposed upon the equilibrium shift that is introduced on the H term by the complexant introduced by the electrolyte.

Secondly, the enhanced efficiency is brought about due to increased transport kinetics, which can be explained as the "Debye-Falkenhagen" effect. This is a phenomenon caused by the elimination of the ionic atmosphere (the ion field surrounding a target ion species) which occurs due to a high frequency field. The "Debye-Falkenhagen" effect deals with an ionic species which is moved forward and backward very rapidly, it concludes that the retarding effect of the ionic atmosphere is brought to zero. Another explanation is that the ions are moved so rapidly that no counter ion atmosphere can develop.

The "Wien" effect can also provide insight into the observed phenomenon. It predicts that higher ion mobilities will result from very high electric fields.

The observed phenomenon suggests that other types of dissociating wave energy such as sonic or ultrasonic wave energy could be superimposed to further enhance, or in certain instances, could be used as a sole contributor to the dissociation of the species from the matrix.

As an alternative theory, (using a pulsed field gradient spin-echo rationale), it is possible that the excitation causes jumps between neighboring clay particles.

The following examples are provided solely to illustrate the invention and do not in any manner represent a limitation of the scope of the invention.

EXAMPLE 1

Soil samples were removed from a uranium mine tailing deposit located in Bruni, Tex. and analyzed for uranium residue. A trace uranium assay using a sodium iodide detector connected to a spectrophotometric analyzer, manufactured by Quantum Technology Corporation of Atlanta, Ga., determined the contamination to be on the order of picocuries per gram. Comparable soil samples from the same lot were previously studied for leach characteristics and it was determined that the residual uranium was so tightly bound into the soil that conventional extractants would have virtually no effect. Such phenomenon is routinely encountered when soil residues have been previously exposed to routine chemical extractants. In all cases, the soil samples were subjected to microwave (4.5 gigahertz) energy for approximately 2 minutes. During this time, a vacuum unit was used to draw the electrolyte away from the soil. A control sample was exposed to the identical chemical contact for the same time (in this case, the electrolyte was warmed to account for the thermal effect of the microwave field). At the conclusion of the extraction cycle, the liquid sample was again analyzed with the spectrophotometric analyzer. Table 1 below illustrates the test results.

TABLE 1

| | | With Microwave | | | Control-(No Microwave) | | |
|---|---|---|---|---|---|---|---|
| Run | Electrolyte Description | Quantity Irradiate (Grams) | Counts Total | Cnts Per Gram | Quantity Tested (Grams) | Counts Total | Counts Per Gram |
| 1 | 5% Soln. Na DTPA | 20.5 | 692 ± 111 | 33.8 | 36 | 779 ± 118 | 21.6 |
| 2 | Synex 272 | 17.0 | 339 ± 88 | 20.0 | 17 | 356 ± 72 | 20.9 |
| 3 | 5% Calixarene | 51.5 | 288 ± 61 | 5.6 | 63.5 | 399 ± 51 | 6.2 |
| 4 | 5% Soln. Polyethyleneimine | 94.5 | 136 ± 64 | 1.4 | 70 | 264 ± 60 | 3.8 |

Run #1-Indicates the microwave fields' ability to enhance the desorption of the various metal species in the presence of sodium DTPA.
Run #2-Indicates that there is no tendency for the microwave energy field to shift equilibrium in direction of the organic complexant.
Run #3-Indicates that the microwave field shifts the desorption away from this particular calixarene species probably due to the fact that other metals (other than uranium) are preferred by calixarene.
Run #4-Shows a similar effect to Run #3. The polyethyleneimine complex prefers an ionic association with some difficult to desorb metal, which once desorbed (using microwave energy) becomes strongly bonded to the polyethleimine.

It should be noted that the electrolytes used above in runs 2–4, while not advantageous for decontamination of the particular radioactive species in the particular soil employed in this example, may be acceptable for different types of species and/or soils. Indeed, they may be preferred electrolytes for removal of other types of species. Given the guidance of this disclosure, determining which electrolytes provide advantageous results will be a matter of routine experimentation.

EXAMPLE 2

The following example illustrates the enhanced transport kinetics for radionuclide ions (Cesium 137) in a high clay content soil matrix, which results from the simultaneous introduction of a DC potential and an electromagnetic wave.

Two runs were conducted. Both runs involved soil columns enclosed in cylindrical acrylic housings. Dimensions were 30 cm in length by 14 cm in diameter. In each run, approximately one kilogram of soil was introduced. The Cesium 137 content of the soil mass was $3 \times 10^{-2}$ microcuries, which was uniformly distributed throughout the 1,000 gram mass, i.e., $3 \times 10^{-5}$ microcuries per gram.

In run 1, a 60 volt D.C. potential was established across the length of the cylinder (approximately 2 volts per cm). This resulted in a current flow of 100 milliamps measured between the two electrodes (i.e., the current was 50 amps per $M^2$). In this run, the soil moisture was the only electrolyte. After 72 hours of cell operation, approximately $3.2 \times 10^{-3}$ microcuries of cesium 137 had been extracted, i.e., $3.2 \times 10^{-6}$ microcuries per gram of soil (representing approximately 10% of the total Cesium 137 inventory).

The test setup of run 2 was identical to that of run 1, except that an electromagnetic field was established across the soil cylinder. The electromagnetic field was introduced via two cylindrical carbon electrodes powered by a 60 Hz, 30 volt source. Upon activation of the electromagnetic field, the 100 milliamps current flux dropped and it was necessary to raise the DC potential to 66 volts DC in order to maintain the 100 milliamp current. After 72 hours, $5.2 \times 10^{-3}$ microcuries of Cesium were removed.

The comparison of extraction kinetics of runs 1 and 2 illustrates that a 60 percent (approximately) increase in mobility of cesium ions can be attributed directly to the electromagnetic wave potential.

It will be apparent to those skilled in the art that various modifications and variations can be made to the compositions of matter and methods of this invention. Thus, it is intended that the present invention cover the modifications and variations of this invention provided they come within the scope of the appended claims and their equivalents. For example, it is possible that dissociating wave energies and electrolytes other than those expressly recited can be used with this invention to provide acceptable results.

What is claimed is:

1. A method for effecting or enhancing the desorption of at least a portion of an ionic species selected from the group consisting of metals and radioactive isotopes, said ionic species being adsorbed onto soil particles in a soil matrix, said method comprising applying to said matrix desorbing electromagnetic wave energy selected from the group consisting of radio frequency waves and microwaves in an amount sufficient to effect or enhance desorption of at least a portion of said ionic species from said soil particles in said soil matrix.

2. A method according to claim 1, wherein said electromagnetic wave energy comprises microwaves.

3. A method according to claim 1, wherein said electromagnetic wave energy comprises radio frequency waves.

4. A method according to claim 3, wherein said radio frequency waves are applied to soil comprising clay particles.

5. A method according to claim 4, further comprising the step of applying to said matrix an electrolyte which enhances the desorption and/or migration of said ionic species within said matrix.

6. A method according to claim 3, further comprising the step of applying to said matrix an electrolyte which enhances the desorption and/or migration of said ionic species within said matrix.

7. A method according to claim 1, further comprising the step of applying to said matrix an electrolyte which enhances the desorption and/or migration of associated or dissociated ionic species within said matrix.

8. A method according to claim 7, wherein said electrolyte comprises sodium DTPA.

9. A method according to claim 1, further comprising the step of applying to said matrix an electromagnetic potential sufficient to enhance desorption and/or migration of at least a portion of associated or dissociated species within said matrix.

10. A method according to claim 9, wherein said electromagnetic potential comprises a DC potential.

11. A method according to claim 9, wherein for at least some period of time, said electromagnetic potential is applied concurrently with said desorbing electromagnetic wave energy.

12. A method according to claim 1, wherein said desorbing wave energy comprises a high frequency oscillation sufficient to shift the equilibrium of a species associated with said soil.

13. A method according to claim 12, wherein said equilibrium is shifted toward a more soluble or mobile species.

14. A method according to claim 1, wherein the dissociating electromagnetic wave energy is applied to the matrix by a wave source external to the matrix.

15. A method according to claim 1, wherein the dissociating electromagnetic wave energy is applied to the matrix by a wave source at least partially within the matrix.

16. A method according to claim 1, wherein said dissociating electromagnetic wave energy comprises a high frequency oscillation sufficient to shift the equilibrium of a species associated with said soil.

17. A method for effecting or enhancing the desorption and/or migration of at least a portion of an ionic species selected from the group consisting of metals and radioactive isotopes, said ionic species being adsorbed onto soil particles in a soil matrix, said method comprising the steps of:
A. applying to said matrix desorbing electromagnetic wave energy selected from the group consisting of radio frequency waves and microwaves in an amount sufficient to effect or enhance desorption of at least a portion of said ionic species from said soil particles; and
B. applying to said matrix an electromagnetic potential sufficient to enhance dissociation and/or effect migration of at least a portion of associated or desorbed ionic species present in said matrix.

18. A method according to claim 17, wherein said electromagnetic wave energy comprises microwaves.

19. A method according to claim 17, wherein said electromagnetic wave energy comprises radio frequency waves.

20. A method according to claim 19, wherein said dissociating wave energy is applied to soil comprising clay particles.

21. A method according to claim 20, further comprising the step of applying to said matrix an electrolyte which enhances the desorption and/or migration of said ionic species within said matrix.

22. A method according to claim 21, wherein said electrolyte comprises sodium DTPA.

23. A method according to claim 22, wherein said electromagnetic potential comprises a DC potential.

24. A method according to claim 19, further comprising the step of applying to said matrix an electrolyte which enhances the desorption and/or migration of said ionic species within said matrix.

25. A method according to claim 17, wherein said dissociating electromagnetic wave energy is applied to soil comprising clay particles.

26. A method according to claim 17, further comprising the step of applying to said matrix an electrolyte which enhances the desorption and/or migration of associated or dissociated species within said matrix.

27. A method according to claim 26, wherein said electrolyte comprises sodium DTPA.

28. A method according to claim 17, wherein said electromagnetic potential comprises a DC potential.

29. A method according to claim 17, wherein for at least some period of time, said electromagnetic potential is applied concurrently with said desorbing electromagnetic wave energy.

* * * * *